United States Patent
Seroka

(10) Patent No.: US 11,590,800 B2
(45) Date of Patent: Feb. 28, 2023

(54) NON-PNEUMATIC TIRE

(71) Applicant: Bridgestone Americas Tire Operations, LLC, Nashville, TN (US)

(72) Inventor: Edward S. Seroka, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 626 days.

(21) Appl. No.: 16/528,885

(22) Filed: Aug. 1, 2019

(65) Prior Publication Data

US 2019/0351706 A1 Nov. 21, 2019

Related U.S. Application Data

(63) Continuation of application No. 15/520,364, filed as application No. PCT/US2015/055288 on Oct. 13, 2015, now Pat. No. 10,406,860.

(Continued)

(51) Int. Cl.
*B60C 7/10* (2006.01)
*B60C 7/14* (2006.01)

(52) U.S. Cl.
CPC .............. *B60C 7/102* (2013.01); *B60C 7/10* (2013.01); *B60C 7/107* (2021.08); *B60C 7/146* (2021.08)

(58) Field of Classification Search
CPC ........... B60C 7/102; B60C 7/10; B60C 7/107; B60C 7/146; B60C 7/28; B60C 7/12; B60C 7/125; B60B 9/02; B60B 9/10; B60B 9/12

See application file for complete search history.

(56) References Cited

U.S. PATENT DOCUMENTS 1,016,991 A 2/1912 Herold
1,389,285 A 8/1921 Althoff
(Continued)

FOREIGN PATENT DOCUMENTS

JP 20070137207 A 6/2007
JP 2008044445 A 2/2008
(Continued)

OTHER PUBLICATIONS

International Search Report and Written Opinion of the International Search Authority, dated Jan. 20, 2016, in International Pat. App. No. PCT/US2015/055288, international filing date of Oct. 13, 2015.

(Continued)

*Primary Examiner* — Jason R Bellinger
*Assistant Examiner* — Emily G. Castonguay
(74) *Attorney, Agent, or Firm* — Shaun J. Fox; Thomas Y. Kendrick

(57) ABSTRACT

Various example embodiments of a non-pneumatic tires are presented. In one embodiment, a non-pneumatic tire is provided, comprising: a tread; a support ring comprising a plurality of support ring elements, each having the same diameter, wherein the plurality of support ring elements are coupled to one another by at least one strap; a hub, wherein the tread, the support ring, and the hub are concentric; a plurality of base elements oriented between the tread and the support ring, wherein each of the base elements extends along the width of one of the support ring elements. Alternatively, each of the base elements may extend from an axially outer edge of a support ring element to the center of an adjacent support ring element.

10 Claims, 7 Drawing Sheets

Related U.S. Application Data

(60) Provisional application No. 62/087,017, filed on Dec. 3, 2014.

(56) References Cited

U.S. PATENT DOCUMENTS

| | | | |
|---|---|---|---|
| 4,832,098 A * | 5/1989 | Palinkas | B60C 7/12 |
| | | | 152/11 |
| 5,579,818 A | 12/1996 | Hoppenheit et al. | |
| 6,994,134 B2 | 2/2006 | Grah | |
| 7,429,801 B2 | 9/2008 | Adamson et al. | |
| 8,109,308 B2 | 2/2012 | Manesh et al. | |
| 8,113,253 B2 | 2/2012 | Arakawa et al. | |
| 8,714,217 B2 | 5/2014 | Chon et al. | |
| 8,960,248 B2 | 2/2015 | Cron et al. | |
| 9,272,576 B2 | 3/2016 | Dotson et al. | |
| 10,406,860 B2 * | 9/2019 | Seroka | B60C 7/10 |
| 2004/0159385 A1 * | 8/2004 | Rhyne | B60B 9/04 |
| | | | 152/197 |
| 2006/0249236 A1 | 11/2006 | Moon et al. | |
| 2009/0211674 A1 * | 8/2009 | Hanada | B60C 7/12 |
| | | | 152/53 |
| 2009/0301625 A1 | 12/2009 | Moon et al. | |
| 2010/0132858 A1 | 6/2010 | Arakawa et al. | |
| 2010/0193097 A1 * | 8/2010 | McNier | B60B 9/14 |
| | | | 152/311 |
| 2010/0200131 A1 * | 8/2010 | Iwase | B29D 30/00 |
| | | | 152/209.1 |
| 2010/0307653 A1 | 12/2010 | Delfino et al. | |
| 2011/0240193 A1 | 10/2011 | Matsuda et al. | |
| 2011/0277893 A1 | 11/2011 | Benzing, II | |
| 2012/0060991 A1 * | 3/2012 | Mun | B60C 7/10 |
| | | | 152/323 |
| 2012/0216932 A1 | 8/2012 | Cron et al. | |
| 2012/0234445 A1 | 9/2012 | Manesh et al. | |
| 2012/0318417 A1 | 12/2012 | Dotson et al. | |
| 2013/0278044 A1 | 10/2013 | Dotson et al. | |
| 2013/0278045 A1 | 10/2013 | Dotson et al. | |
| 2013/0306211 A1 | 11/2013 | Kubeck et al. | |
| 2014/0020817 A1 | 1/2014 | Williams et al. | |
| 2014/0367007 A1 * | 12/2014 | Thompson | B60C 7/18 |
| | | | 152/17 |

FOREIGN PATENT DOCUMENTS

| | | |
|---|---|---|
| JP | 2011178308 A | 9/2011 |
| JP | 2011219009 A | 11/2011 |
| JP | 2013071652 A | 4/2013 |
| JP | 2013086274 A | 5/2013 |
| WO | 2013095499 A1 | 6/2013 |

OTHER PUBLICATIONS

English machine translation of Abstract of JP2011178308A.
English machine translation of Abstract of JP2011219009A.
English machine translation of Abstract of JP2013086274A.
English machine translation of Abstract of JP2008044445A.
English machine translation of Abstract of JP20070137207A.
English machine translation of Abstract of JP20070071652A.

* cited by examiner

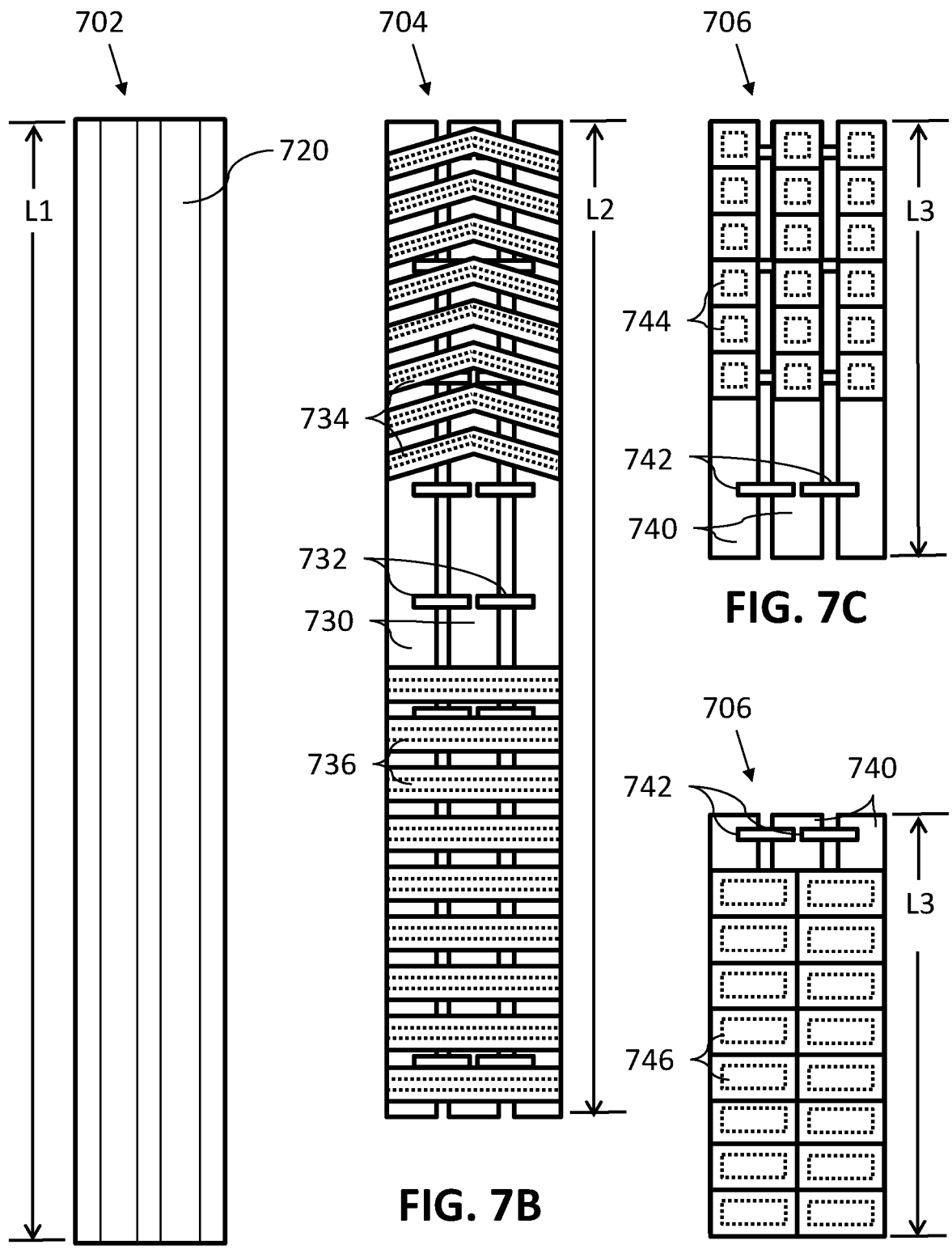

NON-PNEUMATIC TIRE

CROSS-REFERENCE TO RELATED APPLICATIONS

This application is a continuation of U.S. patent application Ser. No. 15/520,364 filed on Apr. 19, 2017, which issued as U.S. Pat. No. 10,406,860 on Sep. 10, 2019, which claims priority to International Patent Application No. PCT/US2015/055288 filed on Oct. 13, 2015, which claims priority to U.S. Patent Application No. 62/087,017 filed on Dec. 3, 2014, each of which is expressly incorporated by reference herein in its entirety.

BACKGROUND

Many vehicles utilize tires to provide contact between the vehicle and a driving surface such as a roadway. Tires may perform a variety of functions, including providing traction, braking, cornering, general handling, vehicle support, shock absorption, and the like.

Many vehicle tires are pneumatic in nature, requiring the tire to maintain an elevated air pressure within the tire in order to properly operate, especially for extended periods. However, loss of this elevated air pressure may severely limit, or even prevent, proper operation of the tire.

As a result, it may be desirable in certain applications to utilize a non-pneumatic vehicle tire, which requires neither air, foam, nor other media to be contained within the tire for proper operation. However, non-pneumatic tires often lack the handling characteristics desired in a vehicle tire. Additionally, non-pneumatic tires may be difficult to manufacture.

What is needed is a non-pneumatic tire having improved handling characteristics and/or is easier to manufacture.

SUMMARY

In one embodiment, a non-pneumatic tire is provided, the non-pneumatic tire comprising: a tread; at least one support ring, wherein the at least one support ring and the tread are concentric; at least one base element oriented between the tread and the at least one support ring; and a hub.

In another embodiment, a non-pneumatic tire is provided, the non-pneumatic tire comprising: a tread; at least one support ring, wherein the at least one support ring and the tread are concentric; at least one ply strip oriented between the tread and the at least one support ring; and a hub.

BRIEF DESCRIPTION OF THE DRAWINGS

The accompanying figures, which are incorporated in and constitute a part of the specification, illustrate various example systems and apparatuses, and are used merely to illustrate various example embodiments. In the figures, like elements bear like reference numerals.

FIG. 7A illustrates an elevational view of an example arrangement of a non-pneumatic tire tread before assembly.

FIG. 7B illustrates an elevational view of an example arrangement of a non-pneumatic support ring before assembly.

FIG. 7C illustrates an elevational view of an example arrangement of a non-pneumatic support ring before assembly.

FIG. 7D illustrates an elevational view of an example arrangement of a non-pneumatic support ring before assembly.

DETAILED DESCRIPTION

Figure 1:
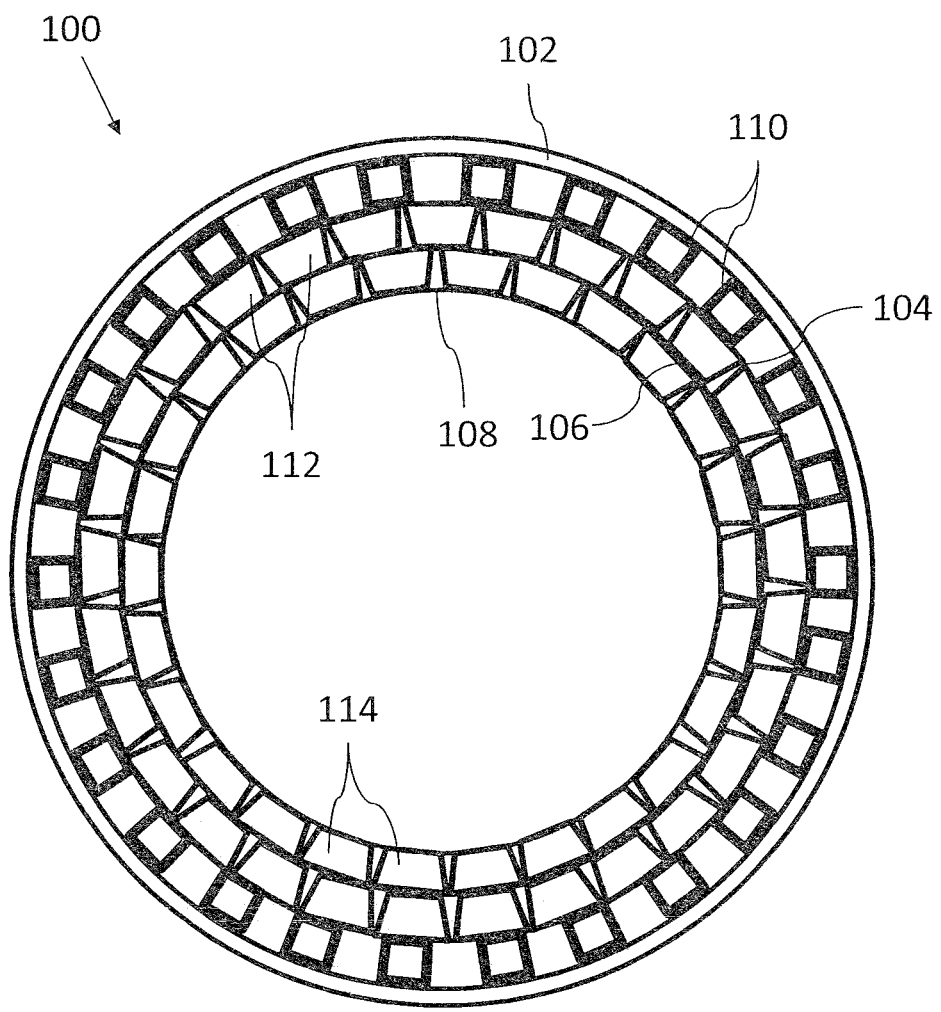
FIG. 1 illustrates a sectional view of an example arrangement of a non-pneumatic tire.

FIG. 1 illustrates an example arrangement of a non-pneumatic tire 100. Tire 100 may include a tread 102, and at least one support ring 104, 106. Tire 100 may include a hub 108. Tire 100 may include at least one base element 110, 112, 114.

Non-pneumatic tire 100 may be configured to operate without air, foam, or other media requiring pressurized containment within tire 100. Non-pneumatic tire 100 may be configured for use on any of a variety of vehicles, including for example a vehicle for operation on roadways. Non-pneumatic tire 100 may be configured for use on any of a variety of vehicles, including for example a road vehicle such as a car, truck, or bus, an agricultural vehicle, an off-the-road vehicle, an all-terrain vehicle, and the like. Non-pneumatic tire 100 may be a tire designed for a specific season and/or condition of use, including for example, summer, winter, snow, mud, off-road, agricultural, and the like. Non-pneumatic tire 100 may be a tire designed for various seasons and/or conditions of use, including for example an all season tire.

Non-pneumatic tire 100 may be a directional tire. Non-pneumatic tire 100 may be a non-directional tire. Non-pneumatic tire 100 may be configured to exhibit a first set of handling characteristics when mounted on a vehicle in a first direction, and a second set of handling characteristics when mounted on a vehicle in a second direction. These various handling characteristics are described further below.

Tread 102 may include a tread compound similar to that utilized in a pneumatic tire. Tread 102 may include a tread compound the same as that utilized in a pneumatic tire. Tread 102 may include a tread compound distinct from that utilized in a pneumatic tire.

Tread 102 may include a tread pattern (not shown) oriented on its radially outer surface. The tread pattern may be a directional tread pattern. At least one of the orientation, design, and reinforcement of at least one of: at least one base element 110, 112, 114, at least one support ring 104, 106, and a sidewall layer (not shown) may be configured to optimize rotation of tire 100 in a specified direction.

The tread pattern may be a non-directional tread pattern. At least one of the orientation, design, and reinforcement of at least one of: at least one base element 110, 112, 114, at least one support ring 104, 106, and a sidewall layer (not shown) may be configured to optimize rotation of tire 100 in a specified direction.

Tread 102 may be configured to be removed from tire 100 and replaced. Tread 102 may wear through use, thus making it desirable to replace tread 102 on tire 100, rather than replacing tire 100 itself.

Tread 102 may be made independently of the remaining elements of tire 100. Tread 102 may be formed from tread stock rubber, and molded in a mold. Tread 102 may be molded in a flat mold, such that tread 102 is substantially planar during molding. Tread 102 may be molded in a flat mold, such that thread 102 is not formed in a ring (i.e., as it is when part of tire 100) during molding. Tread 102 may be cured in a substantially planar state. Tread 102 may be cured such that it is not formed in a ring during curing. Tread 102 may be formed and/or cured in a manner similar to tread used in tire retreading processes. A tread pattern on tread 102 may be formed in tread 102 by a single mold plate, thus eliminating flash that might result from molding of a tread pattern via a plurality of mold plates oriented adjacent one another. A tread pattern on tread 102 may be formed in tread 102 by multiple mold plates tightly fitted to one another, thus eliminating flash that might result from molding of a tread pattern via a plurality of mold plates oriented adjacent one another in a looser fitting.

Curing of tread 102 in a substantially planar state may have any of a variety of advantages. For example, at least one of $8^{th}$, $9^{th}$, $10^{th}$, and $12^{th}$ order harmonic effects due to segmented mold curing (as may be used in curing pneumatic tires) may be reduced or eliminated. Additionally, as a result of curing tread 102 in a substantially planar state, radial flash or "S" diameter flash from segmented mold curing may be reduced or eliminated. Segment mold curing may involve radially bringing together a plurality of mold segments to form an annulus. Gaps between adjacent mold segments may allow tread stock to flow therein during molding, thus creating flash on a tire tread.

Curing of tread 102 in a substantially planar state may reduce or eliminate bull-dozing of tread stock at "S" diameter due to green tire sizing. "S" diameter may be the diameter of the tire between the tread segment lower diameter and the side plate.

Additionally, tread 102 may include a pattern that may be molded through use of thin bladed sipes for greater tire performance tuning, which use of thin blades sipes may be available as the result of curing in a substantially planar state.

Curing of tread 102 in a substantially planar state may allow optimization of tread noise patterns in tread 102. Tread base units may not need manipulation at segment ends to optimize segment end placement, while optimizing tread noise patterns.

As a result of curing of tread 102 in a substantially planar state, tire 100's outside diameter may not be limited to the "S" diameter distance as may be the case in pneumatic tires, or tires having tread 102 otherwise molded in an annular shape. Tires may be limited in outside diameter to "S" diameter distance as a result of container stroke in the mold container.

As a result of curing of tread 102 in a substantially planar state, tire 100 may be cured without use of a curing bladder. This may eliminate a step and/or element in the creation of tire 100.

Curing of tread 102 in a substantially planar state may result in a more uniform tire diameter in tire 100.

Tire 100 may include at least one support ring 104, 106. At least one support ring 104, 106 may include a diameter that is less than the diameter of tread 102. At least one support ring 104, 106 may include more than one support ring (e.g., 104 and 106), each of which may have a diameter less than the diameter of tread 102, and wherein one of which has a diameter less than the other. For example, support ring 106 may have a diameter less than support ring 104. At least one support ring 104, 106 may be oriented radially inward of tread 102.

Each of at least one support ring 104, 106 may include at least one support ring element oriented at the same diameter. For example, support ring 104 may include a series of adjacent support ring elements oriented adjacent one another, each having the same diameter. This orientation is illustrated more clearly at FIGS. 6B, 6C, 7B, 7C, and 7D. A plurality of independent support ring elements may be oriented at the same diameter to form a single support ring, including for example support ring 104, 106. Tire 100 may include any number of support rings, including one, two, or more. Tires 100 having a greater outside diameter may include more support rings, while tires 100 having a smaller outside diameter may include less support rings. Tires 100 having a greater aspect ratio may include more support rings, while tires 100 having a smaller aspect ratio may include less support rings.

At least one support ring 104, 106 may be formed from any of a variety of materials, including for example a rubber, a polymer, a metal, an alloy, a composite, and the like.

At least one support ring 104, 106 may have an overall axial width that is greater than the overall axial width of tread 102. At least one support ring 104, 106 may have an overall axial width that is less than the overall axial width of tread 102. At least one support ring 104, 106 may have an overall axial width that is equal to the overall axial width of tread 102. The overall axial width of one of at least one support ring 104, 106 relative another of at least one support ring 104, 106 may vary. Varying the overall axial width of at least one support ring 104, 106 relative another may be used to tune the load capacity of tire 100. Varying the overall axial width of at least one support ring 104, 106 relative another may be used to tune the handling characteristics of tire 100. Varying the overall axial width of at least one support ring 104, 106 relative another may be used to tune any tire performance characteristics of tire 100.

At least one support ring 104, 106 may be substantially concentric to tread 102. At least one support ring 104, 106 may be non-concentric to tread 102. One of at least one support ring 104, 106 may be concentric to tread 102, while another of at least one support ring 104, 106 may be non-concentric to tread 102. Varying the concentricity of at least one support ring 104, 106 relative another, and/or tread 102, may be used to tune the handling characteristics of tire 100. Varying the concentricity of at least one support ring 104, 106 relative another, and/or tread 102, may be used to tune any tire performance characteristics of tire 100.

Hub 108 may be oriented radially inward of each of tread 102 and at least one support ring 104, 106. Hub 108 may have a diameter less than the diameter of tread 102 and at least one support ring 104, 106.

Hub 108 may configured to engage a rim portion (not shown) of a wheel, to connect tire 100 to a vehicle. Hub 108 may be at least a portion of a rim portion of a wheel, configured to connect tire 100 to a vehicle.

Hub 108 may be formed from any of a variety of materials, including for example a rubber, a polymer, a metal, an alloy, a composite, and the like.

Tire 100 may include at least one base element 110, 112, 114. At least one base element may be oriented adjacent to at least one of tread 102 and at least one support ring 104, 106. At least one base element 110, 112, 114 may be oriented between at least one of tread 102 and at least one support ring 104, 106. At least one base element 110 may include a plurality of base elements 110 oriented between tread 102 and a first support ring, such as support ring 104. At least one base element 112 may include a plurality of base elements 112 oriented between a first support ring, such as support ring 104 and a second support ring, such as support ring 106, if any. At least one base element 114 may include a plurality of base elements 114 oriented between a second support ring, such as support ring 106, if any, and hub 108. Tire 100 may be devoid of base elements 114 between support ring 106 and hub 108.

At least one base element 110, 112, 114 may supply load bearing capability to tire 100. At least one base element 110, 112, 114 may supply handling capability to tire 100. At least one base element 110, 112, 114 may operatively connected at least one of tread 102, support ring 104, and support ring 106 to one another.

At least one base element 110, 112, 114 may have any of a variety of shapes. At least one base element 110, 112, 114 may be a substantially solid element. At least one base element 110, 112, 114 may be a substantially hollow element. At least one base element 110, 112, 114 may be at least partially hollow. At least one base element 110, 112, 114 may be a combination of substantially solid elements and at least partially hollow elements.

At least one base element 110, 112, 114 may include any solid or hollow shapes, including for example: a cylindrical shape, a conical shape, a frustrum shape, a square cone shape, a rectangular cone shape, an ellipsoid shape, a barrel shape, a trapezoidal shape, a cubical shape, a cuboid shape, a regular polygonal shape, an irregular polygonal shape, and the like.

At least one base element 110, 112, 114 may be formed from any of a variety of materials, including for example a rubber, a nylon, a polyester, a polymer, a metal, an alloy, a composite, and the like. At least one base element 110, 112, 114 may be formed from a single ply of a material. At least one base element 110, 112, 114 may be formed from multiple plies of a material.

At least one base element 110, 112, 114 may be elongated in nature, so as to have at least one side longer than an adjacent side. At least one base element 110, 112, 114 may include a plurality of base elements 110, 112, 114, and any of the plurality of base elements 110, 112, 114 may be oriented in a first direction, while another of the plurality of base elements 110, 112, 114 may be oriented in a second direction. At least one of at least one base element 110, 112, 114 may be oriented in a first direction (e.g., base element 110), while another may be oriented in a second direction (e.g., base element 112). At least one of at least one base element 110, 112, 114 may be oriented in a first direction (e.g., base element 110), while another may be oriented in a second direction (e.g., base element 112), and another may be oriented in a third direction (e.g., base element 114). Any of base element 110, 112, 114 may be oriented in the same direction, different directions, or a combination thereof. At least one of base element 110, 112, 114 may be oriented in at least one of a circumferential direction (e.g., parallel to direction of travel of tire 100), an axial direction (e.g., perpendicular to direction of travel of tire 100), and an inclined direction (e.g., angled with respect to circumferential direction and axial direction of tire 100).

At least one base element 110, 112, 114 may be connected to at least one of tread 102, support ring 104, support ring 106, and hub 108. Tire 100 may be assembled by molding independent elements and assembling the same. In one embodiment, tread 102 is molded and/or cured independently of the remaining elements of tire 100. At least one support ring 104, 106 may be molded and/or cured independently of the remaining elements of tire 100. Hub 108 may be molded and/or cured independently of the remaining elements of tire 100. At least one base element 110, 112, 114 may be molded and/or cured independently of the remaining elements of tire 100.

At least one base element 110 may be attached to at least one of tread 102 and support ring 104 during assembly of tire 100. At least one base element 112 may be attached to at least one of support ring 104 and support ring 106 during assembly of tire 100. At least one base element 114 may be attached to at least one of support ring 106 and hub 108 during assembly of tire 100.

At least one base element 110, 112, 114 may be attached to at least one of tread 102, support ring 104, 106, and hub 108 while at least one of tread 102, at least one support ring 104, 106, and hub 108 are oriented substantially planar. Following attachment of at least one base element 110, 112, 114 to at least one of tread 102, support ring 104, 106, and hub 108, at least one of tread 102, at least one support ring 104, 106, and hub 108 may be attached to one another in a layered manner. Following attachment of at least one base element 110, 112, 114 to at least one of tread 102, at least one support ring 104, 106, and hub 108, at least one of tread 102, support ring 104, 106, and hub 108 may be formed into a ring/annulus. In one embodiment, two or more of tread 102, at least one support ring 104, 106, and hub 108 may be layered and formed into a ring/annulus, after which the remainder of tread 102, at least one support ring 104, 106, and hub 108 may be added to the ring/annulus.

At least one base element 110, 112, 114 may be attached to at least one of tread 102, at least one support ring 104, 106, and hub 108 in any of a variety of manners. For example, at least one base element 110, 112, 114 may be attached to at least one of tread 102, at least one support ring 104, 106, and hub 108 by at least one of mechanical clips, adhesives, and the like. As an additional example, at least one base element 110, 112, 114 may be attached to at least one of tread 102, at least one support ring 104, 106, and hub 108 by curing (e.g., crosslinking) of at least one base element 110, 112, 114 with at least one of tread 102, at least one support ring 104, 106, and hub 108.

At least one base element 110, 112, 114 may be reinforced. At least one base element 110, 112, 114 may be reinforced so as to increase the strength of at least one base element 110, 112, 114. Reinforcement of at least one base element 110, 112, 114 may affect the handling characteristics of tire 100. Reinforcement of at least one base element 110, 112, 114 may affect any tire performance characteristics of tire 100.

Reinforcement of at least one base element 110, 112, 114 may be effected through any of a variety of mechanisms. For example, where at least one base element 110, 112, 114 is hollow, at least one ridge or fin may be oriented on at least one of an inside surface of at least one base element 110, 112, 114 and an outside surface of at least one base element 110, 112, 114. Where at least one base element 110, 112, 114 is solid, at least one ridge or fin may be oriented on an outside surface of at least one base element 110, 112, 114.

The at least one ridge or fin may include a raised portion extending from the surface of at least one base element 110, 112, 114. The at least one ridge or fin may be may be oriented in at least one of a circumferential direction (e.g., parallel to direction of travel of tire 100), an axial direction (e.g., perpendicular to direction of travel of tire 100), and an inclined direction (e.g., angled with respect to circumferential direction and axial direction of tire 100). The at least one ridge or fin may be oriented in any of a variety of directions, including wherein the at least one ridge or fin includes a plurality of ridges or fins, any of which are oriented in the same direction, or different directions. The at least one ridge or fin may intersect another ridge or fin.

At least one base element 110, 112, 114 may be at least partially hollow. The void within at least one base element 110, 112, 114 may be at least partially filled with another material. For example, a foam, closed-cell or open-cell Styrofoam, a semi-solid material, a material having different density, a material having different viscosity, a material having a different or variable hardness, or the like. The void within at least one base element 110, 112, 114 may be filled with a material to provide additional strength and/or support to base element 110, 112, 114. The void within at least one base element 110, 112, 114 may be filled with a material to mitigate noise in tire 100. The void within at least one base element 110, 112, 114 may be filled with a material to enhance and/or fine-tune the performance of tire 100.

Tire 100 may additionally include a sidewall layer (not shown) operatively connected to at least one of tread 102, at least one support ring 104, 106, and hub 108. The sidewall layer may be a reinforced underlayer.

The sidewall layer may be connected to tread 102 and hub 108. The sidewall layer may be connected about a portion of the periphery of tread 102 and hub 108, such that the sidewall layer has an open design similar to a lattice design.

The sidewall layer may be at least partially load-bearing. The sidewall layer may be minimally load-bearing. The sidewall layer may allow less loss of momentum of tire 100 as tire 100 passes over obstacles. The sidewall layer may improve fuel economy of tire 100 as compared to a pneumatic tire. The sidewall layer may supply lateral stiffness for cornering and steering. The sidewall layer may supply no lateral stiffness for cornering and steering.

The sidewall layer may be a decorative covering configured to conceal and/or protect at least one of the remaining elements of tire 100. The sidewall layer may include indicia, ornamentation, logos, and the like pertaining to tire 100. The sidewall layer may include information pertaining to tire 100. The sidewall layer may include one or more decorative colors, textures, and/or designs.

The sidewall layer may be formed from any of a variety of materials, including for example a ballistic nylon, Kevlar®, or rubber. The sidewall layer may be formed from an abrasion-resistant material. The sidewall layer may be formed from a puncture-resistant material. The sidewall layer may be cured with at least a portion of tire 100. The sidewall layer may be cured independent of the remainder of tire 100. The sidewall layer may be a material that does not require curing. The sidewall layer may be a material that does not require molding.

The sidewall layer may be attached to any of the remaining elements of tire 100 via any of a variety of mechanisms, including for example a mechanical clip, adhesive, or curing as described above.

Figure 2:
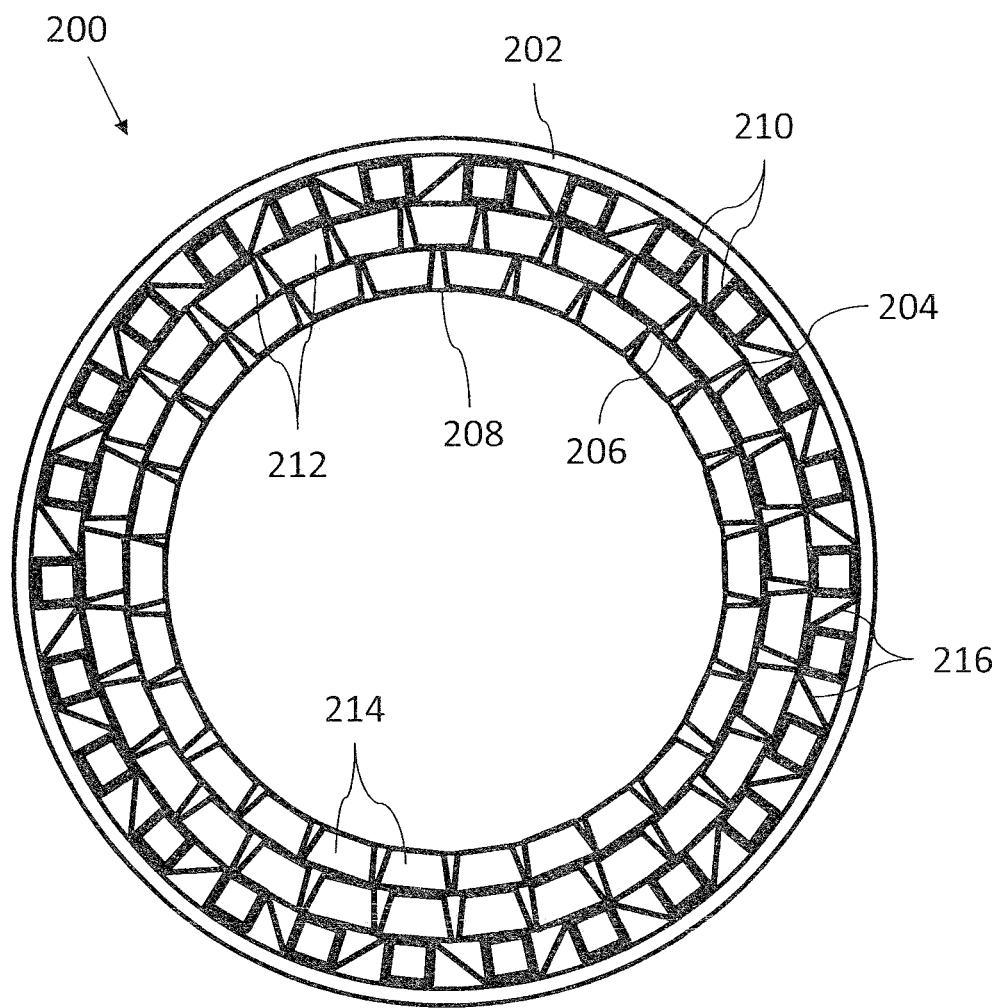
FIG. 2 illustrates a sectional view of an example arrangement of a non-pneumatic tire.

FIG. 2 illustrates an example arrangement of a non-pneumatic tire 200. Tire 200 may include a tread 202, and at least one support ring 204, 206. Tire 200 may include a hub 208. Tire 200 may include at least one base element 210, 212, 214.

Tire 200 may include at least one ply strip 216. At least one ply strip 216 may be oriented between at least two of tread 202, support ring 204, and support ring 206.

At least one ply strip 216 may be configured to supply load bearing to tire 200. At least one ply strip 216 may be configured to effect handling characteristics of tire 200. At least one ply strip 216 may be configured to effect any tire performance characteristics of tire 200. At least one ply strip 216, independent of, or in conjunction with, at least one base element 210, 212, 214, may be altered to effect changes in handling characteristics or any tire performance characteristics of tire 200.

At least one ply strip 216 may be formed from any of a variety of materials, including for example, a rubber, a polymer, a nylon, a polyester, a composite, a metal, an alloy, and the like. At least one ply strip 216 may be formed from a single ply (i.e., layer) of material. At least one ply strip 216 may be formed from a plurality of plies of material.

At least one ply strip 216 may be attached to at least one of tread 202 and at least one support ring 204, 206. At least one ply strip may be attached to hub 208. At least one ply strip 216 may be attached to at least one of tread 202, at least one support ring 204, 206, and hub 208 through any of a variety of attachment mechanisms, including for example a clip, adhesive, or curing as described above.

At least one ply strip 216 may be attached to at least one of tread 202, at least one support ring 204, 206, and hub 208 when at least one of tread 202, at least one support ring 204, 206, and hub 208 are oriented in a substantially planar orientation. Following assembly of at least one ply strip 216 with at least one of tread 202, at least one support ring 204, 206, and hub 208, the at least one of tread 202, at least one support ring 204, 206, and hub 208 may be formed into a ring/annulus.

At least one ply strip 216 may be used in conjunction with at least one base element 210, 212, 214. As illustrated, at least one ply strip 216 may be oriented between at least one base element 210, 212, 214. At least one ply strip 216 may be oriented between each of at least one base element 210. At least one ply strip 216 may extend between at least one of tread 202, support ring 204, and support ring 206. At least one ply strip 216 may extend substantially radially. At least one ply strip 216 may extend at an angle inclined relative to the radial direction of tire 200. At least one ply strip 216 may extend at an angle, and may have alternating angles between adjacent base elements 210, 212, 214, as illustrated in FIG. 2.

At least one ply strip 216 may extend substantially circumferentially in tire 200. At least one ply strip 216 may extend substantially axially in tire 200. At least one ply strip 216 may extend at an angle between the circumferential and axial directions in tire 200. At least one ply strip 216 may include a plurality of ply strips 216, each of which may extend in the same direction or different directions. At least one ply strip 216 may be substantially planar and elongated. At least one ply strip 216 may be at least one of curved and bent.

Figure 3:
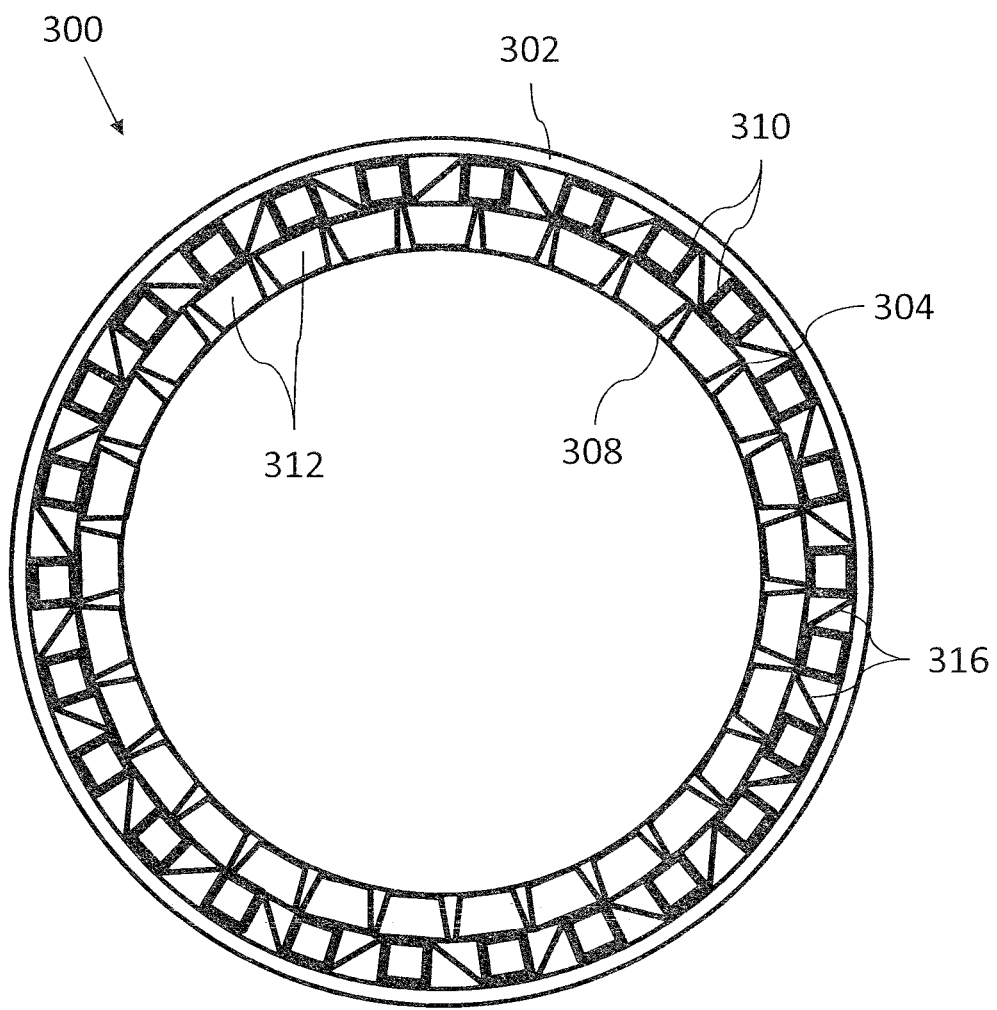
FIG. 3 illustrates a sectional view of an example arrangement of a non-pneumatic tire.

FIG. 3 illustrates an example arrangement of a non-pneumatic tire 300. Tire 300 may include a tread 302, and at least one support ring 304. Tire 300 may include a hub 308. Tire 300 may include at least one base element 310, 312. Tire 300 may include at least one ply strip 316. As illustrated, tire 300 may include only a single support ring 304.

Figure 4:
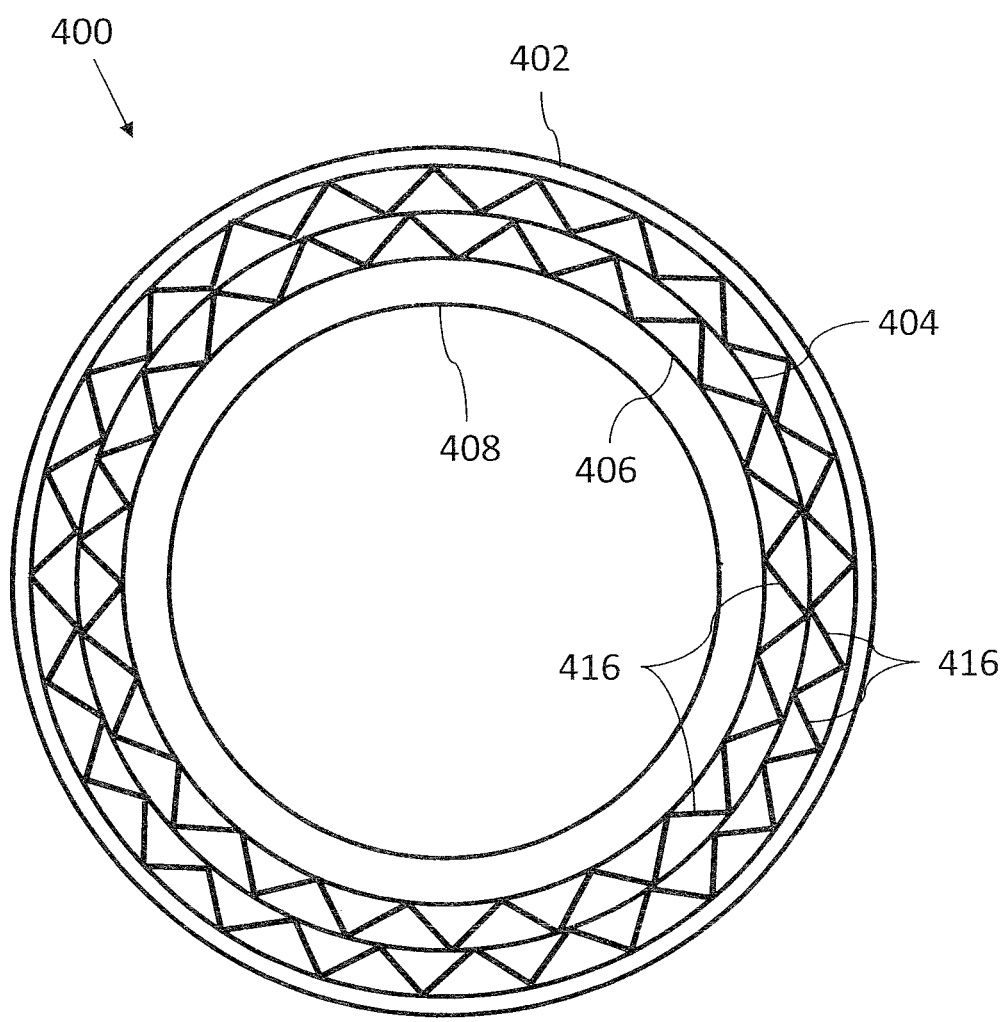
FIG. 4 illustrates a sectional view of an example arrangement of a non-pneumatic tire.

FIG. 4 illustrates an example arrangement of a non-pneumatic tire 400. Tire 400 may include a tread 402, and at least one support ring 404, 406. Tire 400 may include a hub 408. Tire 400 may include at least one ply strip 416.

As illustrated, tire 400 may be devoid of base elements. Tire 400 may include a plurality of ply strips 416 arranged in a pattern. Tire 400 may include a plurality of ply strips 416 oriented between at least two of tread 402, support ring 404, support ring 406, and hub 408. In one embodiment, tire 400 is devoid of ply strips 416 between support ring 406 and hub 408. Support ring 406 and hub 408 may directly engage one another.

Ply strips 416 may be arranged in any of a variety of patterns capable of supporting a vehicle upon tire 400. For example, ply strips 416 may be oriented in a "zig zag" pattern so as to form a plurality of triangles. Ply strips 416 may be oriented substantially radially. Ply strips 416 may be oriented in a bent configuration so as to create a plurality of arches.

Figure 5:
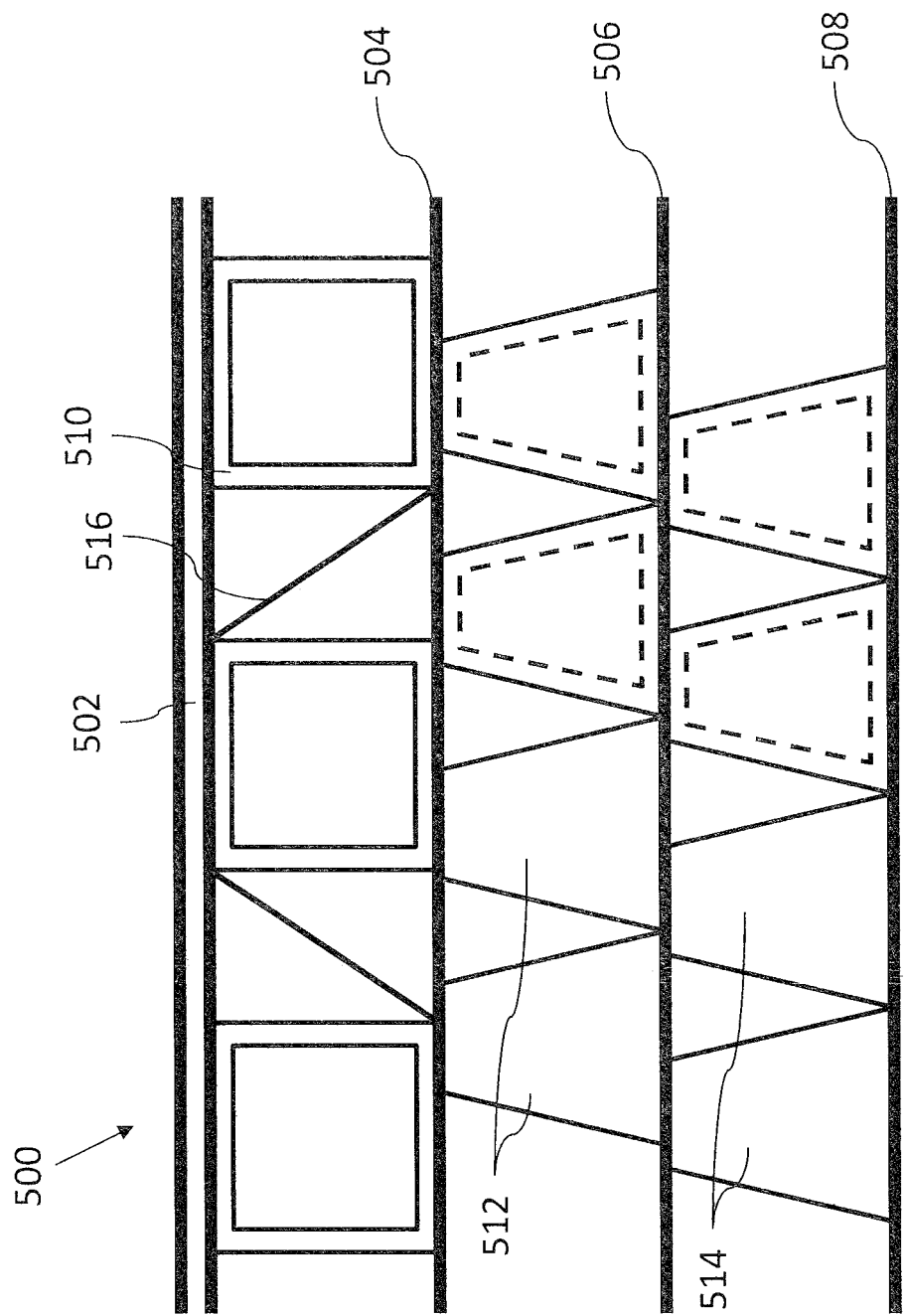
FIG. 5 illustrates a partial sectional view of various example arrangements of a non-pneumatic tire.

FIG. 5 illustrates an example arrangement of a non-pneumatic tire 500 in a substantially planar configuration before being formed into a ring/annulus. Tire 500 may include a tread 502, and at least one support ring 504, 506. Tire 500 may include a hub 508. Tire 500 may include at least one base element 510, 512, 514. Tire 500 may include at least one ply strip 516.

As illustrated in FIG. 5, at least one base element, for example, base element 510 may be substantially hollow. Base element 510 may be formed in the shape of a cuboid. Base element 510 may have a trapezoidal cross-section. Base element 510 may have a wall having a thickness. Base element 510 may include a substantially hollow interior that is in communication with the exterior of base element 510. Base element 510 may include a substantially hollow interior that is not in communication with the exterior of base element 510.

As illustrated, base elements 512, 514 may be either substantially solid or substantially hollow. Base elements 512, 514 may be substantially hollow and may have an interior that is either in communication with, or not in communication with, the exterior of base elements 512, 514. In one embodiment, any combination of base elements 510, 512, 514 may be included in tire 500, including for example any of a variety of shapes, solid structures, hollow structures, interiors in communication with exteriors, and interiors isolated from exteriors.

At least one ply strip 516 may be oriented between any of base elements 510, 512, 514. At least one ply strip 516 may extend between at least two of tread 502, support ring 504, support ring 506, and hub 508. In one embodiment, tire 500 is devoid of at least one of base elements 510, 512, 514. Tire 500 may be devoid of at least one of base elements 510, 512, 514 and may instead include a plurality of ply strips 516 oriented between at least two of tread 502, support ring 504, support ring 506, and hub 508.

Figures 6A, 6B, 6C:
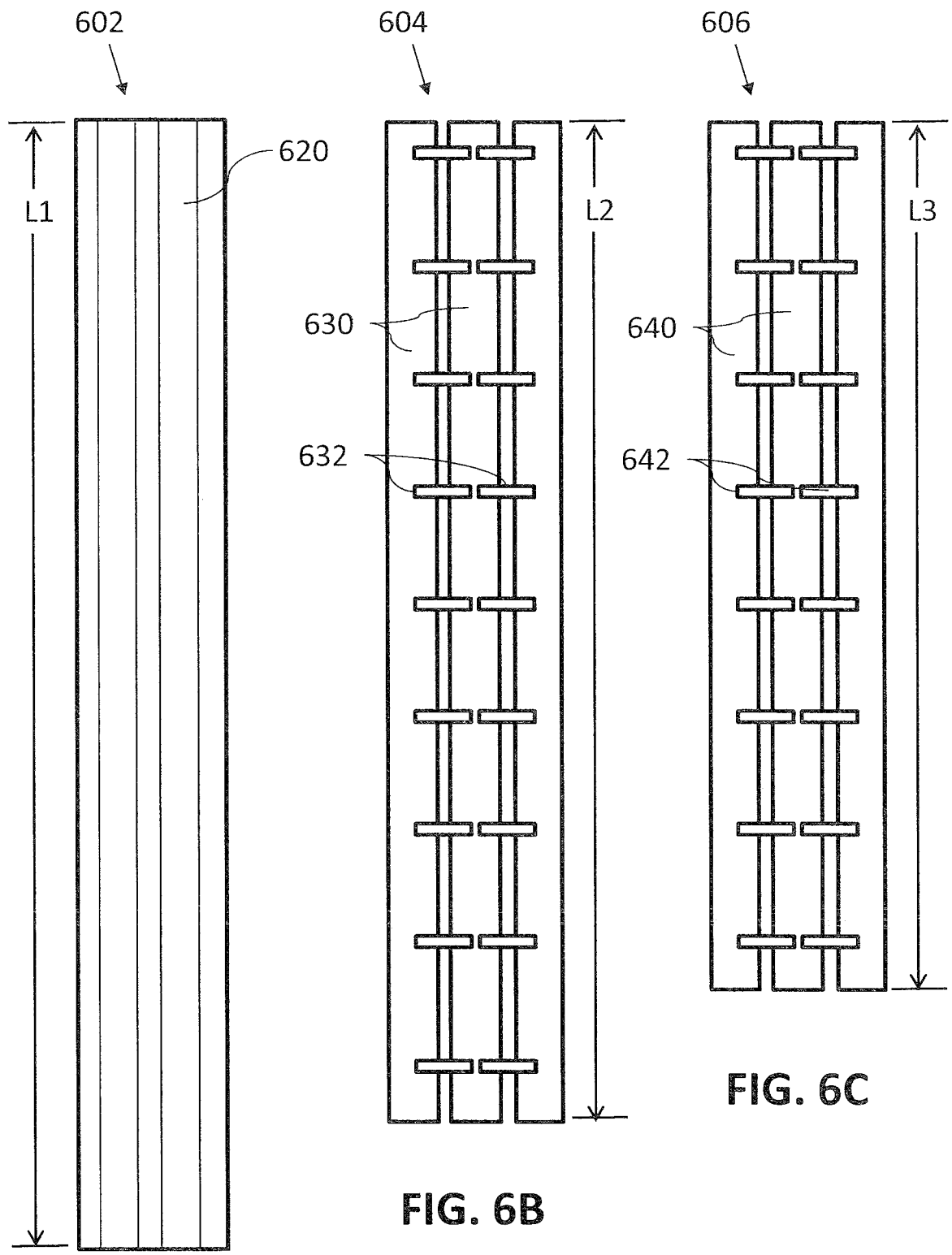
FIG. 6A illustrates an elevational view of an example arrangement of a non-pneumatic tire tread before assembly.
FIG. 6B illustrates an elevational view of an example arrangement of a non-pneumatic support ring before assembly.
FIG. 6C illustrates an elevational view of an example arrangement of a non-pneumatic support ring before assembly.

FIG. 6A illustrates an example arrangement of a non-pneumatic tire tread 602 before assembly. Tread 602 may include a tread pattern 620. Tread 602 may include a length L1.

Tread pattern 620 may be any of a variety of tire tread patterns. Tread pattern 620 may be a directional tread pattern. Tread pattern 620 may be a non-directional tread pattern. Tread pattern 620 may be a tread pattern configured for operation of a vehicle for any of a variety of purposes, including for example operation on a roadway, operation off the road, operation in agricultural applications, operation in inclement weather, and the like.

FIG. 6B illustrates an example arrangement of a non-pneumatic support ring 604 before assembly. Support ring 604 may include a plurality of support ring elements 630. Support ring elements 630 may be connected to one another by at least one strap 632. Support ring 604 may include a length L2.

Independent support ring elements 630 may be oriented adjacent one another in a single support ring 604. Use of a plurality of independent support ring elements 630 may improve cornering performance. That is, support ring 604 may have less tendency to "roll over" laterally during cornering as a result of the extra flexibility in support ring 604 by virtue of multiple support ring elements 630. Instead, support ring 604 featuring multiple support ring elements 630 may facilitate a tire, including tread 602, to flex and maintain more contact with the roadway as compared to other tires, including for example pneumatic tires.

Use of a plurality of independent support ring elements 630 may allow tread 602 to move and flex more during cornering maneuvers. The ability of tread 602 to move and flex may increase tread life of a tire incorporating tread 602. Upon wear of tread 602 past a recommended tread depth, damage of tread 602, or a service interval of tread 602 exceeding recommended service life, tread 602 may be removed from a tire and replaced with a new tread 602.

At least one strap 632 may be any of a variety of mechanical fasteners capable of joining two or more support ring elements 630 adjacent one another. At least one strap 632 may be formed from any of a variety of materials, including for example a rubber, a polymer, a metal, an alloy, a composite, and the like. At least one strap 632 may mechanically couple to two or more support ring elements 630, for example via a fastener. At least one strap 632 may mechanically couple to two or more support ring elements 630, for example via an adhesive. At least one strap 632 may couple to two or more support ring elements 630 via co-curing of at least one strap 632 and two or more support ring elements 630, such that the two materials crosslink.

Support ring 604 may have a diameter less than the diameter of tread 602 upon forming of a tire. Accordingly, support ring 604 may have a lesser circumference than tread 602. The circumference of support ring 604 and tread 602, once formed into a ring/annulus, is substantially equal to lengths L2 and L1, respectively. Accordingly, length L2 of support ring 604 may be less than length L1 of tread 602.

FIG. 6C illustrates an example arrangement of a non-pneumatic support ring 606 before assembly. Support ring 606 may include a plurality of support ring elements 640. Support ring elements 640 may be connected to one another by at least one strap 642. Support ring 606 may include a length L3.

Support ring 606 may include a plurality of support ring elements 640 connected by at least one strap 642. Connection of support ring elements 640, materials therein, connection mechanisms, and effects of connection may be substantially similar to connection of support ring elements 630 in support ring 604 by at least one strap 632.

Support ring 606 may have a diameter less than the diameter of tread 602 and support ring 604 upon forming of a tire. Accordingly, support ring 606 may have a lesser circumference than tread 602 and support ring 604. The circumference of support ring 606, support ring 604, and tread 602, once formed into a ring/annulus, is substantially equal to lengths L3, L2, and L1, respectively. Accordingly, length L3 of support ring 606 may be less than length L1 of tread 602 and length L2 of support ring 604.

FIG. 7A illustrates an example arrangement of a non-pneumatic tire tread 702 before assembly. Tread 702 may have a tread pattern 720. Tread 702 may have a length L1.

FIG. 7B illustrates an example arrangement of a non-pneumatic support ring 704 before assembly. Support ring 704 may include a plurality of support ring elements 730.

Support ring elements 730 may be connected to one another by at least one strap 732. Support ring 704 may include a length L2.

Support ring 704 may include at least one base element 734, 736. At least one base element 734, 736 may be substantially similar to base elements described above. At least one base element 734, 736 may have any of a variety of shapes as described above.

As an example, base element 734 may have a chevron shape, such that the outer ends of the base element are oriented circumferentially offset from the center of the base element. Base element 734 may have a chevron shape such that a point is formed at about the center of base element 734.

As another example, base element 736 may be oriented substantially axially. Base element 736 may be substantially straight, such that the outer ends of the base element are oriented circumferentially aligned with the center of the base element.

Base elements 734, 736 are intended for illustrative purposes only. It should be understood that base elements can take any of a variety of shapes and orientations, including circumferentially-extending, axially-extending, inclined relative to one or both of the circumferential direction and the axial direction, curved, bent, and the like. Base elements 734, 736 may be spaced from one another. Base elements 734, 736 may abut one another.

Base elements 734, 736 may be substantially hollow. Base elements 734, 736 may be solid.

FIGS. 7C and 7D illustrate example arrangements of a non-pneumatic support ring 706 before assembly. Support ring 706 may include a plurality of support ring elements 740. Support ring elements 740 may be connected to one another by at least one strap 742. Support ring 706 may include a length L3.

Support ring 706 may include at least one base element 744, 746 may be substantially similar to base elements described above. At least one base element 744, 746 may have any of a variety of shapes as described above.

For example, at least one base element 744 may be oriented such that it extends about the width of one of support ring elements 740. At least one base element 744 may include a plurality of base elements. The plurality of base elements may form lines of base elements 744 substantially aligned with each of the plurality of support ring elements 740.

In another example, at least one base element 746 may be oriented such that it spans more than one support ring element 740. At least one base element 746 may span the entire width of support ring 706. At least one base element 746 may span the width of two or more support ring elements 740. At least one base element 746 may span a width greater than the width of a single support ring element 740. At least one base element 746 may extend from an axially outer edge of a first support ring element 740 to about the center of an adjacent support ring element 740.

Base elements 744, 746 are intended for illustrative purposes only. It should be understood that base elements can take any of a variety of shapes and orientations, including circumferentially-extending, axially-extending, inclined relative to one or both of the circumferential direction and the axial direction, curved, bent, and the like. Base elements 744, 746 may be spaced from one another. Base elements 744, 746 may abut one another.

Base elements 744, 746 may be substantially hollow. Base elements 744, 746 may be solid.

Any of non-pneumatic tires 100, 200, 300, 400, 500, and tires formed from the components illustrated in FIGS. 6A-6C and 7A-7D, collectively "the tires" may be assembled by any of a variety of methods. As described above, any of various components of the tires may be cured or molded independent of one another. As described above, any of various components of the tires may be prepared in a substantially planar orientation, after which the elements may be formed into a ring/annulus to create the tires.

In one embodiment, any of the various components of the tires may be attached to one another through any of a variety of mechanisms, including for example mechanical clips, mechanical adhesion, and curing. Any of the various components of the tires may be attached to one another through any combination of a variety of mechanisms.

Mechanical clips may include a fastener or other device configured for connecting the clips to the components. Mechanical clips may be configured to clamp at least a portion of the components. Mechanical clips may be configured to extend through at least a portion of the components.

Adhesives may be any of a variety of adhesives used to bond elements to one another. Adhesives may require heat to cure. Adhesives may require heat at a prescribed time interval to cure. A mold may be used to contain elements of the tires and heat the elements to cure adhesives. A mold may be used to maintain elements in a desired orientation during curing. Cure times of the adhesive may be less than traditional tire cure times as at least the tread may be pre-cured.

A mold may be used to cure and crosslink elements A mold may be used to contain elements of the tires and heat the elements to cure the elements. A mold may be used to maintain elements in a desired orientation during curing.

The molds referenced above with respect to curing of adhesives and/or tire elements may include full-circle molds. The molds may have no tread pattern, but rather may simply support a pre-cured tread. As it is unnecessary to mold the tread during the curing process, must less internal pressure may be necessary to cure the tires, as the pre-cured tread does not need to be forced into a mold element to take a pattern. Additionally, use of a mold as described may eliminate the necessity of post-cure inflation of the tire, as the tire is non-pneumatic.

Any of the tires described herein may be directional in nature. That is, the tires may be configured to be mounted on a vehicle such that they primarily roll in a specified direction. Any of the tires described herein may be non-directional.

The tread pattern of any of the tires described herein may be directional in nature. The tread pattern of any of the tires described herein may be non-directional in nature.

The orientation of various elements of the tires, including for example base elements, ply strips, support rings, and sidewall layer may change the footprint of the tires. In one embodiment, any of the tires described herein may have two directions of rotation, such as direction of rotation A and direction of rotation B. The tire may have a specific tread footprint when mounted on a vehicle such that direction of rotation A is oriented with the direction of travel. The tire may have a specific tread footprint when mounted on a vehicle such that direction of rotation B is oriented with the direction of travel. Direction of rotation A and direction of rotation B are opposite one another.

The footprint associated with direction of rotation A may be optimized to perform best in specific weather conditions. For example, the footprint associated with direction of rotation A may be optimized to perform best in at least one of spring, summer, and fall conditions. The footprint associated with the direction of rotation A may be optimized to perform best at common speeds for the vehicle bearing that tire, which may be for example highway speeds.

Any of the tires may have elements oriented such that the tread has less reinforcement when the tire is operating in direction of rotation B. The footprint associated with direction of rotation B may be optimized to perform best in specific weather conditions. For example, the footprint associated with direction of rotation B may be optimized to perform best in winter conditions. The footprint associated with the direction of rotation B may be larger than the footprint associated with the direction of rotation A. The footprint associated with the direction of rotation B may be optimized to perform best at common speeds for the vehicle bearing that tire in winter conditions, which may be for example less than highway speeds common in less inclement seasons.

The footprint associated with direction of rotation B may have an increased length. The footprint associated with direction of rotation B may have an increased length in the circumferential direction. The footprint associated with direction of rotation B may be increased in size, and as such, may support vehicle weight over a larger surface area. This support of vehicle weight over a larger surface area may result in increased traction. Decreased reinforcement of the tread of the tire in direction of rotation B may cause the tire to have a smaller aspect ratio during operation of vehicle in direction of rotation B. The vehicle may sit closer to the roadway, thus lowering the center of gravity of the vehicle as compared to mounting of the tire with direction of rotation A oriented in the direction of travel.

In practice, one may orient the tires on a vehicle such that direction of rotation A is aligned with the direction of travel at the beginning of less inclement seasons, such as spring, summer, and/or fall. One may orient the tires on a vehicle such that direction of rotation B is aligned with the direction of travel at the beginning of more inclement seasons, such as winter. In another example embodiment, one may orient tires on a vehicle such that direction of rotation A is aligned with the direction of travel when the tire is to be operated on more stable surfaces (e.g., asphalt), and one my orient the tires on a vehicle such that direction of rotation B is aligned with the direction of travel when the tire is to be operated on less stable surfaces (e.g., mud or sand).

Any of the tires disclosed herein may be mounted on a vehicle. The tires may be mounted to a vehicle through a wheel having a rim portion. The rim and/or wheel may be a conventional vehicle rim or wheel. The rim and/or wheel may be specialized to accept the tires.

A rim may engage the hub of the tire. A rim may engage the radially innermost support ring of the tire. A rim may engage at least one of the hub and the radially innermost support ring of the tire via an interference fit at or near the rim's outside diameter. A rim may engage at least one of the hub and the radially innermost support ring of the tire through any of a variety of mechanisms, including for example an adhesive, mechanical fasteners, interference fit, a combination of any of these mechanisms, and the like.

A conventional vehicle rim may engage at least one of the hub of the tire and the radially innermost support ring of the tire. The tire may engage a conventional rim through the use of bead elements. The bead elements may selectively secure the tire to the conventional rim. The bead elements may be attached to the tire. The bead elements may be attached to the tire through any of a variety of mechanisms, including for example mechanical clips, adhesives, curing, and the like. The bead elements may provide an interference fit of the tire to the rim. The tire may be attached to the rim via any of a variety of mechanisms, including through the use of bead elements that are: bolted to the rim, forced onto the rim through tensioners, and the like.

Any of the tires disclosed herein may be prepared in any of a variety of sizes, for example, sizes configured to fit conventional rims, sizes configured to fit specialized rims, sizes configured to substantially match common and/or existing tire sizes, sizes configured to optimize performance, and the like.

Any of the tires disclosed herein may be prepared in different sizes while utilizing the same base elements. That is, a larger tire may include more base elements oriented in a ring so as to increase the circumference of the ring, and thus increase the diameter of the tire. A smaller tire may include less base elements oriented in a ring so as to decrease the circumference of the ring, and thus decrease the diameter of the tire. Additionally, a larger tire may include more layers of base elements and support rings, so as to increase the section height of the tire, measured as the tire's outside diameter less its inside diameter. A smaller tire may include less layers of base elements and support rings, so as to decrease the section height of the tire. In this manner, common elements (e.g., base elements, support rings, and the like) may be used in a variety of tire sizes without the need for custom elements for each tire size. Alternatively, custom elements (e.g., base elements, support rings, and the like) may be used in any of a variety of tire sizes.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A non-pneumatic tire, comprising:
   a tread;
   a support ring comprising a plurality of support ring elements, each having the same diameter, wherein the plurality of support ring elements are coupled to one another by at least one strap;
   a hub,
      wherein the tread, the support ring, and the hub are concentric;
   a plurality of base elements oriented between the tread and the support ring,
      wherein each of the base elements extends along the width of one of the support ring elements, and
      wherein the plurality of base elements abuts one another.

2. The non-pneumatic tire of claim 1, wherein the plurality of base elements is substantially hollow.

3. The non-pneumatic tire of claim 1, wherein the plurality of base elements is substantially solid.

4. The non-pneumatic tire of claim 1, wherein the plurality of base elements form a line of base elements aligned with each of the plurality of support ring elements.

5. The non-pneumatic tire of claim 1, wherein at least one of the plurality of base elements has one of a chevron shape and a substantially straight shape.

6. A non-pneumatic tire, comprising:
   a tread;
   a support ring comprising a plurality of support ring elements, each having the same diameter, wherein the plurality of support ring elements are coupled to one another by at least one strap;
   a hub,
      wherein the tread, the support ring, and the hub are concentric;
   a plurality of base elements oriented between the tread and the support ring,
      wherein each of the base elements extends from an axially outer edge of one support ring element to the center of an adjacent support ring element,
      wherein the plurality of base elements abuts one another.

7. The non-pneumatic tire of claim 6, wherein the plurality of base elements is substantially hollow.

8. The non-pneumatic tire of claim 6, wherein the plurality of base elements is substantially solid.

9. The non-pneumatic tire of claim 6, wherein the support ring comprises three support ring elements.

10. The non-pneumatic tire of claim 9, wherein each of the base elements extends from either: (1) an axially outer edge of a first support ring element to the center of an adjacent second support ring element or (2) an axially outer edge of a third support ring element to the center of the adjacent second support ring element.

* * * * *